United States Patent
Bittner (10) Patent No.: US 10,405,683 B1
(45) Date of Patent: Sep. 10, 2019

(54) SYSTEM AND METHOD FOR DETECTING THE ADDITION OR REMOVAL OF A PHYSICAL OBJECT

(71) Applicant: Jonathan E. Bittner, Ashburn, VA (US)

(72) Inventor: Jonathan E. Bittner, Ashburn, VA (US)

(*) Notice: Subject to any disclaimer, the term of this patent is extended or adjusted under 35 U.S.C. 154(b) by 0 days.

(21) Appl. No.: 16/164,058

(22) Filed: Oct. 18, 2018

(51) Int. Cl.
- A47G 29/12 (2006.01)
- A47G 29/122 (2006.01)
- G01S 7/481 (2006.01)
- G01S 7/52 (2006.01)

(52) U.S. Cl.
CPC ..... *A47G 29/1214* (2013.01); *A47G 29/1225* (2013.01); *G01S 7/4813* (2013.01); *G01S 7/52036* (2013.01); *A47G 2029/1226* (2013.01)

(58) Field of Classification Search
CPC .................... G01S 11/16; G02B 2027/0105
USPC ......................................................... 340/569
See application file for complete search history.

(56) References Cited

U.S. PATENT DOCUMENTS

| | | | |
|---|---|---|---|
| 3,935,994 A | 2/1976 | Darvishian | |
| 4,154,393 A | 5/1979 | Darvishian | |
| 4,633,236 A | 12/1986 | Buhl | |
| 5,861,805 A | 1/1999 | Reeves | |
| 6,028,517 A | 2/2000 | Sansone et al. | |
| 6,433,684 B1 | 8/2002 | Lie | |
| 6,462,659 B1 | 10/2002 | Schuette | |
| 6,980,110 B1 | 12/2005 | Hoben et al. | |
| 7,786,862 B1 | 8/2010 | Campbell | |
| 2003/0204477 A1 | 10/2003 | McNett | |
| 2006/0013070 A1* | 1/2006 | Holm | G01S 5/0081 367/128 |
| 2008/0037799 A1* | 2/2008 | Yarygin | H04R 1/403 381/63 |
| 2015/0016665 A1 | 1/2015 | Tanner | |
| 2016/0335594 A1 | 11/2016 | Czachor, Jr. et al. | |
| 2019/0011621 A1* | 1/2019 | Karafin | H04N 13/344 |

FOREIGN PATENT DOCUMENTS

| | | |
|---|---|---|
| CN | 203619290 U | 6/2014 |
| JP | 5845142 B2 | 1/2016 |
| WO | 2016/138582 A1 | 9/2016 |

* cited by examiner

*Primary Examiner* — Fabricio R Murillo Garcia
(74) *Attorney, Agent, or Firm* — Standley Law Group LLP; Adam J. Smith (57) ABSTRACT

A system and method for determining the addition or removal of an object from a receptacle is provided. An ultrasound sensor may emit one or more bursts of ultrasonic energy and detect the amplitude of the echoes from each respective burst over time. A microcontroller may determine a decay rate of each respective burst from the amplitudes of the respective echoes. The decay rates are compared for changes within the receptacle caused by reflection, transmission, absorption, and diffusion of the ultrasound waves. If the difference between the second and first decay rates is larger than a predetermined amount, the addition of an object is determined.

18 Claims, 6 Drawing Sheets

SYSTEM AND METHOD FOR DETECTING THE ADDITION OR REMOVAL OF A PHYSICAL OBJECT

CROSS-REFERENCE TO RELATED APPLICATION

This application makes no priority claim.

TECHNICAL FIELD

Exemplary embodiments of the present invention relate generally to a system and method for detecting the addition or removal of physical objects.

BACKGROUND AND SUMMARY OF THE INVENTION

Figure 1:
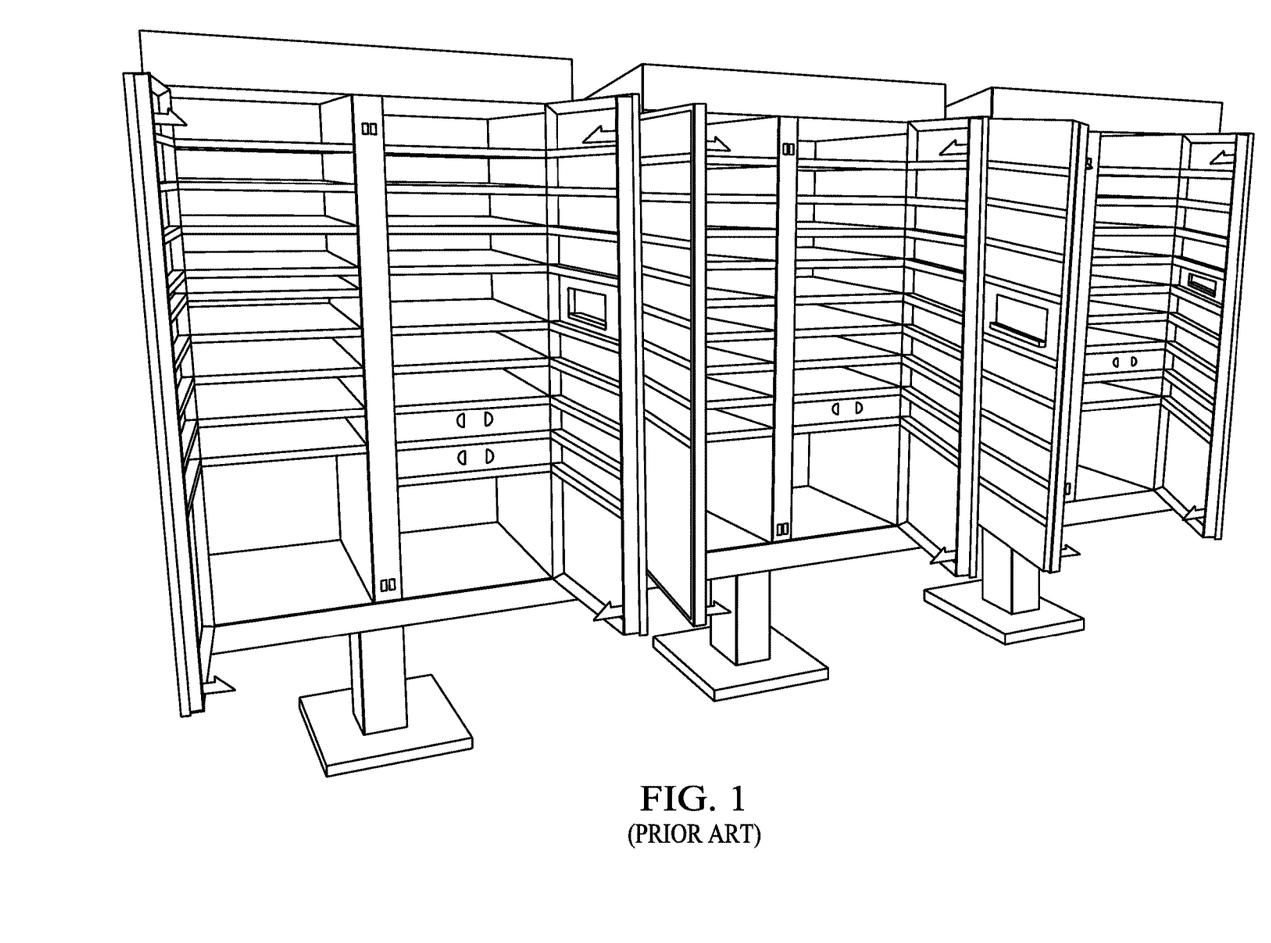
FIG. 1 is an exemplary prior art centralized mail delivery installation.

A nearly daily routine in most residences and places of business is the waiting for, checking for, retrieval of mail once delivered to one's mail receptacle and, in some cases, walking back from the mail receptacle empty handed. Existing mailbox mail detection systems detect the opening or closing of a mailbox by affixing a detector to the mailbox door. Such systems are inherently susceptible to false positives that can occur when the mailbox is opened, closed, or otherwise disturbed, but no mail in fact is deposited therein. Such systems are also susceptible to false negatives whenever the mailbox utilizes an alternative mode of mail deposition, such as a letter slot that permits a letter to be slipped in the mailbox without the door being opened. Furthermore, such systems are unsuitable for cluster mailboxes that are common in apartment complexes, post offices, and neighborhoods where the mailman opens a single door to multiple mailboxes at once. The United States Postal Service prefers to establish the most efficient mode of delivery in new residential developments and is now requiring most new developments to install centralized mail delivery installations for residential communities, known as Neighborhood Delivery Centers or cluster mailboxes. An example of such a centralized mail delivery installation is shown in FIG. 1.

Other mail detection systems detect changes in the weight of the load supported by the mailbox, assuming that mail deposited therein will increase the weight pushing against the floor of the mailbox, or in other cases, assuming that the combined weight of the mailbox and its contents will detectably vary with each item of mail added to the mailbox. These systems are disadvantageous because they require the installation of a scale or other means for measuring weight, either in a custom mailbox or a preexisting mailbox, which is a relatively expensive undertaking both in the initial installation, and because they require regular maintenance due to the sensitivity of the scales, which need regular repairs and calibration. Furthermore, changes in climate may change the calibration of scales which can cause false detection to occur, requiring ongoing recalibration. Scales also fail whenever mail is stuffed or crammed into mailboxes; for example, when larger envelopes are folded and/or wedged into the box and then become effectively "suspended" by the friction of the envelope against the walls of the box so that their mass is not fully applied to the scale. Furthermore, many scales are unreliable for detecting very light objects, and most weight-detection systems fail to reliably discern small fluctuations in weight such as that contributed by a paper letter, postcard, or other low-weight mail. This is especially the case when a very light object is added to a heavy mailbox or a mailbox that already contains a relatively heavy load.

Others have used cameras positioned inside a mailbox to detect mail. However, this approach may cause privacy issues because such information could be targeted by cyber criminals. Furthermore, detecting change in images requires significant computational power, which may result in a decreased operational time for a battery powered device. Still others have positioned security cameras to detect motion around their mailbox, but this again fails to reliably indicate whether mail has actually been added or removed from the mailbox enclosure. Nearby wildlife, for example, may provide false positives. Still others have relied upon detecting changes in light intensity inside a mailbox enclosure to detect mail as the deposited mail is typically a different color and reflects light differently from the interior of a mailbox. However, this method also fails to account for changes associated with sunlight and nearby artificial lighting that can penetrate gaps in the mailbox enclosure and cause unreliable results.

Armstrong in Canada Pat. No. CA2016/050214 requires a tray-like system be installed to cover nearly the entire floor of the mailbox. This method is bulky and cannot detect the presence of additional mail being added if the original mail already occupies the entire floor of the mailbox.

Others use ultrasonic sensors as a ranging device to detect an object, such as mail, placed between the ultrasonic sensor and another sensor or reflector. Such an approach in effect acts as an open or closed circuit and is limited insofar as it cannot reliably detect small pieces of mail, such as a letter or postcard lying flat on the floor of the mailbox or along the side of the mailbox wall, because the cross section of the mail relative to the direction of the ultrasonic sensor is so small that it is lost in the clutter of the mailbox floor or walls. Others have used multiple ultrasonic sensors, but this adds to the complexity of the system and requires additional installation of either bulky devices or multiple sensors separated throughout the mailbox.

One approach for detecting the delivery of mail to a mailbox enclosure is disclosed in U.S. Pat. No. 4,633,236 A to Buhl issued Dec. 30, 1986, where an ultrasonic sensor is installed on one end of the enclosure and a reflector is installed on the other end to develop a predetermined path for the presence of mail to close the circuit or the removal of mail to open the circuit. However, this method is ill suited to reliably detect small parcels, such as postcards lying flat along the vertical sides of the enclosure.

Another approach disclosed in U.S. Pat. No. 6,462,659 B1 to Schuette issued Aug. 8, 2002 discusses that unspecified variations in received acoustic signals, such as a break in ultrasonic communications, can be used to detect mail within a mail receptacle. However, this method is unable to detect small parcels of mail (e.g., a postcard) lying flat on every possible surface of a mailbox enclosure, without ultrasonic sensors dispersed along a minimum of three axis. Such a setup would be burdensome to install and more expensive compared to installing a single ultrasonic sensor in a mailbox receptacle.

Japanese Pat. No. JP5845142B2 to Suzuki Hiroo relies upon ultrasound signals being blocked or the path broken. As previously mentioned, such an approach is unable to reliably detect small parcel of mail, or mail oriented in particular directions or located in particular areas.

Others have used ultrasound transceivers as they are primary intended to operate as ranging devices to detect mail. In Canadian Pat. No. CN203619290U to Li Yongqui, a baseline of the time of flight of the signal to bounce back is performed on an empty mailbox enclosure. This method measures the distance between the sensor and the nearest object, in this case the opposite side of the enclosure. When mail is inserted into the mailbox enclosure the time of flight is reduced and mail is detected. However, this method only works for large parcels such as boxes and is ill suited for small mail parcels such as, for example, a postcard lying flat on the bottom of the mailbox enclosure. A postcard's cross section in such a scenario may be lost in the clutter of the returning signal depending on its orientation and positioning. Even when the ultrasound sensor is placed as close as possible to the floor of the mailbox enclosure reliability is low because of many false positives associated with increased clutter noise caused by the bottom of the mailbox enclosure.

U.S. Pat. No. 7,786,862 B1 to Campbell issued Aug. 31, 2010 requires the sensor to be operated nearly continuously to sense motion. This is not a practical solution as the power supply is typically portable in nature (e.g., batteries). Such a portable power supply would be quickly exhausted upon such continuous use. Attachment to a continuous power supply, such as a utility line, would add significant complexity and cost for manufacturing and installation.

Therefore, what is needed is a system and method for reliably detecting the addition or removal of various size physical objects. The present invention is a system and method for reliably detecting the addition or removal or various size physical objects.

An ultrasonic sensor may be placed within a receptacle. The ultrasonic sensor may emit a burst of ultrasonic waves which may be reflected off the surfaces of the receptacle as well as any object(s) located therein. The sensor may be calibrated by emitting a burst of ultrasonic waves when the receptacle is known to be empty and receiving the echoes of the waves from the initial burst over a period of time. The ultrasound sensor may detect the amplitude of echoed waves from the initial burst and record the received data over multiple echoes, such as until the signals can no longer be heard above the noise floor. A microcontroller in communication with the ultrasound sensor may calculate the rate of decay of the amplitude associated with the original burst of ultrasound energy to established a baseline decay rate. Additional calibration may be performed with objects in the receptacle.

The ultrasound sensor may selectively emit one or more subsequent bursts of ultrasonic waves and detect the amplitude of the echoed waves from each of the subsequent bursts over a second period of time. The received data may be processed by the microcontroller to determine a test decay rate for each subsequent burst. The respective test decay rate may be compared against the baseline decay rate to determine if one or more objects have been added or removed from the receptacle. In exemplary embodiments, the determination that an object has been added to the receptacle is made if the test decay rate is larger than the baseline decay rate by a predetermined amount. If the test decay rate is not greater than the baseline decay rate by the predetermined amount, the test decay rate may be set as the new baseline decay rate.

In other exemplary embodiments, the determination that an object has been added to the receptacle is made by subtracting the baseline decay rate from the test decay rate to arrive at a first value. If the first value is greater than a predetermined amount, then a determination that an object has been added is made. If no such determination is made, the test decay rate is subtracted from the baseline decay rate to arrive at a second value. If the second value is greater than the predetermined amount, then a determination is made that an object was removed from the receptacle. However, if the second value is less than the predetermined amount the test decay rate may be set as the new baseline rate.

Such a system and method results in reliable detection of even small objects, such as but not limited to, the presence of a postcard lying flat on the bottom of a mailbox. Such a system and method could furthermore be utilized across multiple receptacle types, be capable of reliably detecting various size objects, require little to no modification to the receptacle, provide a small profile device which can operate for extended periods of time, and be installed easily by a non-handy person.

While several examples are given of the detection of mail or other objects in a mailbox, it is contemplated that the receptacle may be any closed compartment or area. Likewise, the detected object may be any size or shape object. For example, without limitation, the receptacle may be a room, lockbox, vault, drawer, and the like. Furthermore, while several examples are given of the use of ultrasonic energy and sensors, it is contemplated that other types of energy and related sensors which are capable of exciting molecules in an enclosure may be utilized. Such examples include, without limitation, lasers, x-rays, microwaves, and the like.

Further features and advantages of the devices and systems disclosed herein, as well as the structure and operation of various aspects of the present disclosure, are described in detail below with reference to the accompanying figures.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

FIG. 1 is an exemplary prior art centralized mail delivery installation. As can be seen, a single door may be used by a postal service employee to access multiple individual mail compartments.

Figure 2:
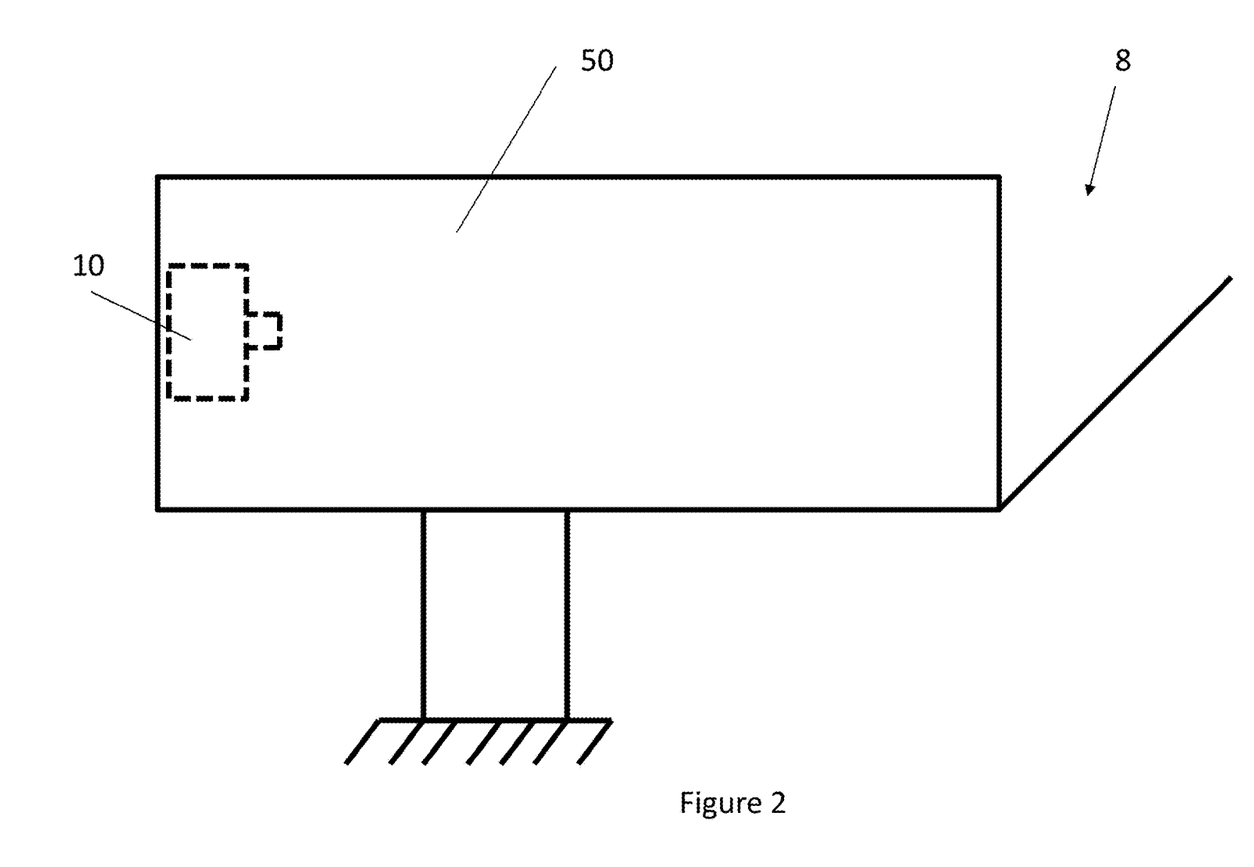
FIG. 2 is a side view of an exemplary receptacle with an exemplary sensor installed.

FIG. 2 is a side view of an exemplary receptacle 50 with an exemplary receptacle unit 10 installed. In the illustrated embodiment, the receptacle 50 is a mailbox. Any size, shape, or type of mailbox is contemplated. Furthermore, any type of receptacle 50 is contemplated. For example, without limitation, the receptacle 50 may be a room, lockbox, vault, drawer, and the like. The receptacle unit 10 may be positioned within the receptacle 50 such that the receptacle unit 10 is capable of emitting and receiving ultrasonic bursts which covers a majority, substantially all, or the entirety of the interior of the receptacle 50. In an exemplary embodiment, the receptacle unit 10 may be installed on a wall facing opposite an opening 8 of the receptacle 50. For example, without limitation, the receptacle unit 10 may be installed on the rear wall of a mailbox.

In other exemplary embodiments, it may be desirable to place the receptacle unit 10 on the interior facing opening 8. Regardless, the receptacle unit 10 may be positioned such that it receives the echoes of emitted ultrasonic bursts. It is contemplated that the ultrasonic bursts described herein may comprise a single wave or multiple waves, similarly they may comprise one grouping of waves or multiple groupings of waves. Each ultrasonic burst may be the same or different as other ultrasonic bursts emitted.

The receptacle unit 10 may be attached to the receptacle 50 using a fastener, adhesive, some combination thereof, or the like. For example, without limitation, the receptacle unit 10 may be screwed, nailed, glued, or welded to the rear wall of the mailbox. In one exemplary embodiment, double-sided all-weather tape may be used to install the receptacle unit 10.

Figure 3:
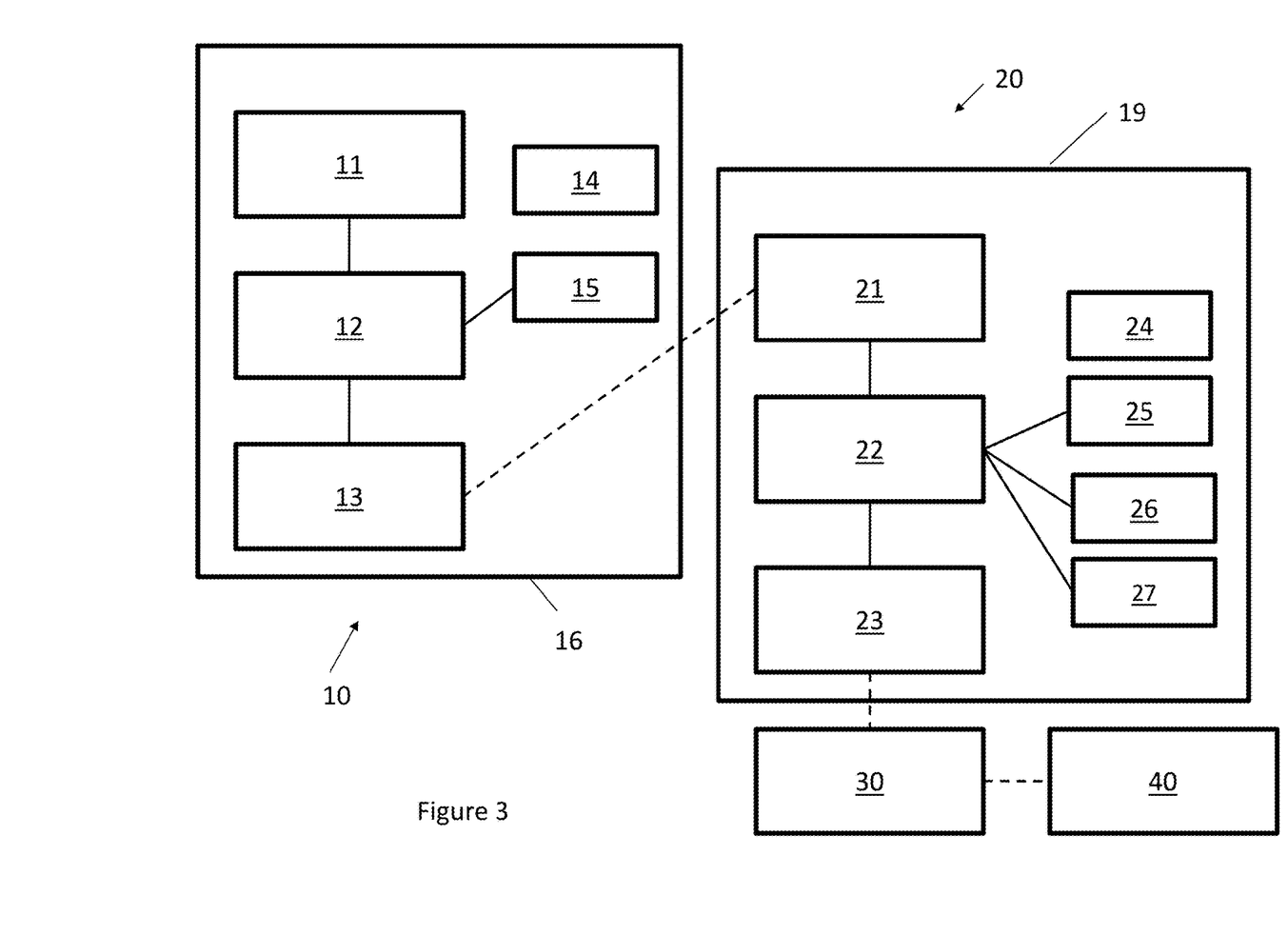
FIG. 3 is a simplified block diagram illustrating various components of an exemplary system, including the sensor of FIG. 2.

FIG. 3 is a simplified block diagram illustrating various components of an exemplary system. The system may comprise the receptacle unit 10 and a remote unit 20, which may be in communication with one another. As discussed, the receptacle unit 10 may be positioned within the receptacle 50. In exemplary embodiments, the remote unit 20 may be located within a user's home, though any location of the remote unit 20 is contemplated.

The receptacle unit 10 may comprise a housing 16. The housing 16 may be comprised of plastic, metal, rubber, or the like. The receptacle unit 10 may further comprise a power source 14. The power source 14 may be located within the housing 16, though such is not required. In exemplary embodiments, the power source 14 may comprise one or more batteries, such as, without limitation, two AA lithium batteries. In other exemplary embodiments, the power source 14 may comprise a plug or other connector which is configured to be placed in electrical connection with a utility line, solar panel, or other power supply. Regardless, the power source 14 may be in electrical connection with one or more of the components of the receptacle unit 10 to supply power to the same.

The receptacle unit 10 may further comprise a microcontroller 12, an ultrasound sensor 11, a radio 13, and an electronic storage device 15. One or more of the microcontroller 12, ultrasound sensor 11, radio 13, and electronic storage device 15 may also be located within the housing 16, though such is not required. The microcontroller 12 may be electrically connected to one or more of the ultrasound sensor 11, the radio 13, and electronic storage device 15.

The ultrasound sensor 11 may comprise a transmitter for emitting ultrasonic bursts, and a receiver for detecting ultrasonic energy. Alternatively, or in addition, the ultrasound sensor 11 may comprise a transceiver for both creating ultrasonic bursts and detecting ultrasonic energy. Regardless, the ultrasound sensor 11 may be configured to selectively emit bursts of ultrasonic waves and likewise detect the echoes of such bursts contacting the ultrasound sensor 11. The microcontroller 12 may be configured to control how and when the ultrasound sensor 11 emits these bursts. For example, without limitation, the microcontroller 12 may be configured to control the timing, amplitude, duration, frequency, and the like of the waves emitted by the ultrasound sensor 11. Likewise, the microcontroller 12 may be configured to receive data from the ultrasound sensor 11 representing detected ultrasonic waves. The microcontroller 12 may store the received data at the electronic storage device 15. The microcontroller 12 may be further configured to process the received data to determine the timing, amplitude, frequency, duration, decay rate, and the like of the received data. The microcontroller 12 may be further configured to compare the decay rates of multiple bursts. In such embodiments, the microcontroller 12 may store the processed data and data regarding the comparisons at the electronic storage device 15.

The remote device 20 may comprise a second radio 21, a second microcontroller 22, a second power source 24, and a second electronic storage device 25. The remote unit 20 may comprise a remote device housing 19. The remote device housing 19 may be comprised of plastic, metal, rubber, or the like. One or more of the second radio 21, second microcontroller 22, second power source 24, and second electronic storage device 25 may be located in the remote device housing 19, though such is not required. The remote unit 20 may be located at the user's home, though any location is contemplated.

The second radio 21 may be in communication with the radio 13 to receive or transmit data between the receptacle unit 10 and the remote unit 20. In exemplary embodiments, the microcontroller 12 may be configured to transmit the data stored at the electronic storage device 15 to the remote unit 20 by way of the radio 13 and the second radio 21. Upon receipt at the remote unit 20, the received data may be stored at the second electronic storage device 25. The second microcontroller 22 may be configured to process the received data to determine the timing, amplitude, frequency, duration, decay rate, and the like of the received data, if not already done so at the microcontroller 12. The second microcontroller 22 may be further configured to compare the decay rates of such bursts.

The second power source 24 may comprise one or more batteries. In other exemplary embodiments, the second power source 24 may comprise a connector configured to be placed in electrical connection with a power supply. For example, without limitation, the second power source 24 may comprise a cord and plug configured to be plugged into a standard outlet. As another example, again without limitation, the second power source 24 may comprise a USB power cord. The power source 24 may be placed in electrical connection with one or more components of the remote unit 20.

The remote unit 20 may further comprise a network connection device 23. The microcontroller 22 may be in communication with the network connection device 23, which may be in communication with one or more remote user devices 40 by way of a network 30. The network 30 may be the world wide web, an internet, an intranet, a cellular network, some combination thereof, or the like. The remote user device 40 may be a server, computer, laptop, smartphone, tablet, some combination thereof, or the like. The remote user device 40 may be configured to receive data representing the addition or removal of an object from the receptacle 50 and provide one or more messages to the user regarding the same. In exemplary embodiments, such messages may be provided via email, text message, or notification via an application installed on the remote user device 40.

The remote unit 20 may further comprise a speaker 26. The speaker 26 may be located within the remote device housing 19, though such is not required. The speaker 26 may be electrically connected to the microcontroller 22. The microcontroller 22 may be configured to cause the speaker 26 to produce an audible sound upon the determination that one or more objects has been added to or removed from the receptacle 50.

The remote unit 20 may further comprise an illumination device 27. The illumination device 27 may be located within the remote device housing 19, though such is not required. The illumination device 27 may be electrically connected to the microcontroller 22. The microcontroller 22 may be configured to cause the illumination device 27 to be illuminated upon the determination that one or more objects has been added to or removed from the receptacle 50. For example, without limitation, the illumination device 27 may be illuminated a particular color to indicate the addition of or presence of an object and be illuminated a different color to indicate the non-presence of or removal of an object.

Figure 4:
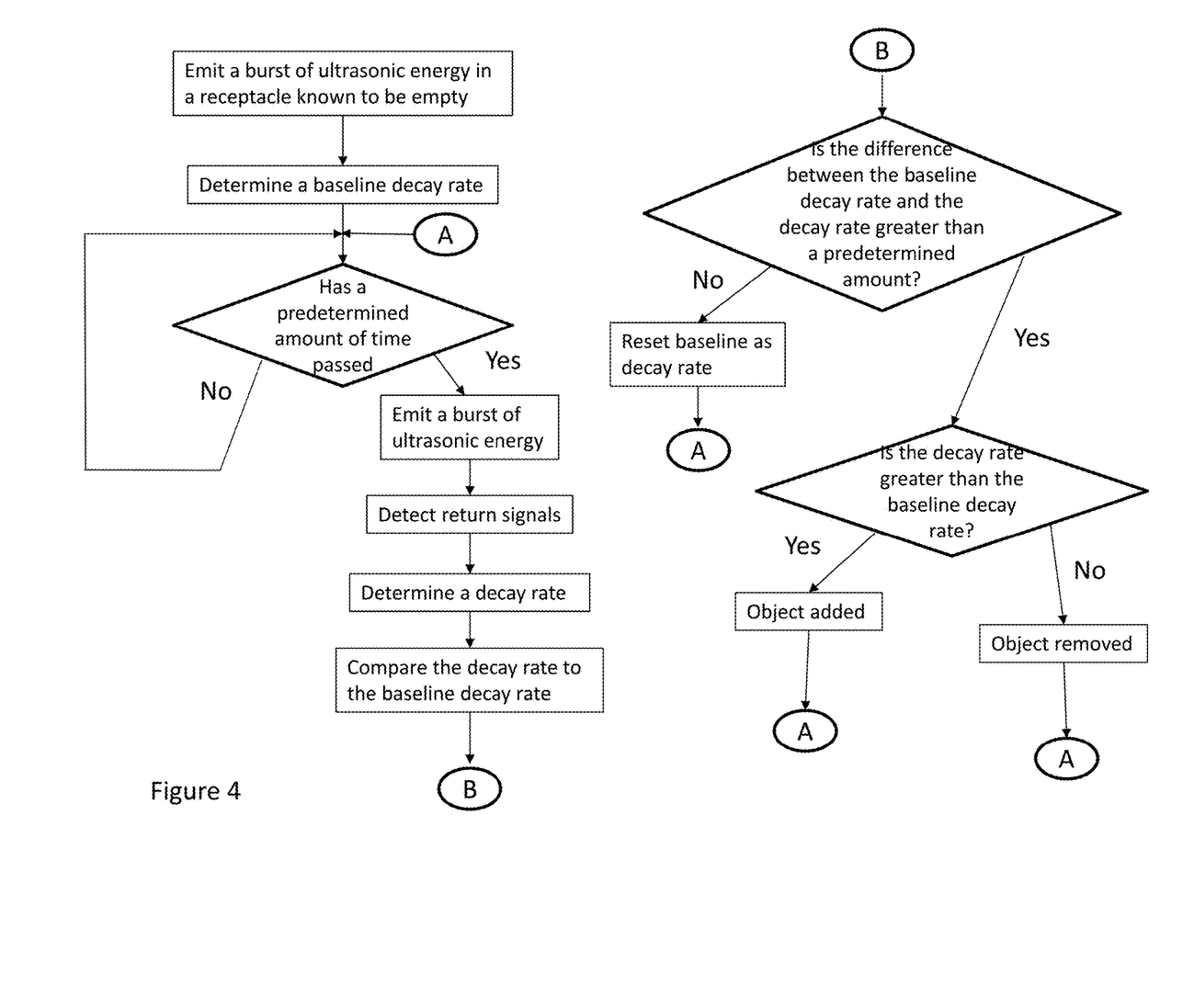
FIG. 4 is a flow diagram illustrating exemplary logic for operating the system of FIG. 3.

FIG. 4 is a flow diagram illustrating exemplary logic for operating the system of FIG. 3. The microcontroller 12 may be configured to cause the ultrasound sensor 11 to selectively emit a burst of ultrasonic energy to create one or more ultrasonic waves. These waves may propagate through the receptacle 50 and be reflected, absorbed, diffused, and reflected back to the ultrasound sensor 11 where they may be detected over a period of time. The microcontroller 12 or the second microcontroller 22 may process the received data to determine the decay rate for the respective burst. In exemplary embodiments, the decay rates described herein may be a linear average of the relevant data.

A first burst of ultrasonic energy may be emitted by the ultrasound sensor 11 when the receptacle is known to be empty. Echoes of the first burst may be detected by the ultrasound sensor 11 over a first period of time. The received data may be processed to arrive at a baseline decay rate. In exemplary embodiments, further calibration may be provided by emitting one or more additional calibration bursts from the ultrasound sensor 11 when the receptacle is known to contain one or more objects. Echoes of the additional calibration bursts may be detected by the ultrasound sensor 11 over a second period of time, which may be equal to or different from the first period of time. The received data may be processed to arrive at one or more subsequent calibration decay rates. The baseline decay rate and calibration decay rates may be used to set a difference between the baseline decay rate and a subsequent test decay rate that is sufficient to reliably determine that one or more objects have been added or removed from the receptacle 50. Similarly, if the difference between the baseline decay rate and a subsequent test decay rate is less than this predetermined amount, it may be determined that one or more objects have not been added or removed from the receptacle 50. In such cases, the subsequent test decay rate may be used as the new baseline rate.

More specifically, the microcontroller 12 or the second microcontroller 22 may be configured to calculate what the signal amplitude decay rate for the receptacle 50 is when the receptacle 50 is empty. The rate of decay associated with the presence of an object, such as for example without limitation, mail, is dependent on the properties of the ultrasound sensor 11, such as frequency, gain, and beam pattern and therefore is different for each type of ultrasound sensor 11 or may vary with the particular settings of the ultrasound sensor 11. In exemplary embodiments, this can be controlled by the developer by testing it on an empty receptacle 50 and then with various types of objects. The decay rate is also dependent on the shape, size, and material of the receptacle 50. The microcontroller 12 or the second microcontroller 22 may be configured to adjust for these variations by increasing or decreasing the power of the ultrasound burst.

After a baseline decay rate is established, the microcontroller 12 or the second microcontroller 22 may be configured to wait a predetermined amount of time before directing the ultrasound sensor 11 to emit one or more subsequent bursts of ultrasonic energy. The microcontroller 12 may be configured to direct the ultrasound sensor 11 to emit such subsequent bursts of ultrasonic waves at periodic intervals any number of times. During this time, the microcontroller 12 or the second microcontroller 22 may be configured to enter a sleep mode to limit power consumption. In exemplary embodiments, this period of time is sixty (60) seconds though any amount of time is contemplated. Once awakened the microcontroller 12 or the second microcontroller 22 may be configured to conduct a subsequent decay rate test. The data received from the subsequent test may be processed to arrive at a decay rate. Any number of subsequent tests may be performed. Such tests may be performed periodically or at any select time, such as upon receipt of a user request.

The microcontroller 12 or the second microcontroller 22 may determine the difference between the tested decay rate and the baseline decay rate. If it is determined that difference is less than a predetermined amount, the microcontroller 12 or the second microcontroller 22 may be configured to update the baseline decay rate to reflect the tested decay rate as the new baseline decay rate. If, however, the difference is determined to be larger than the predetermined amount, the microcontroller 12 or the second microcontroller 22 may be configured to determine if the tested decay rate is greater than the baseline rate. If so, the microcontroller 12 or the second microcontroller 22 may determine that an object has been added to receptacle 50. If not, the microcontroller 12 or the second microcontroller 22 may determine that an object has been removed from the receptacle 50.

Figure 5:
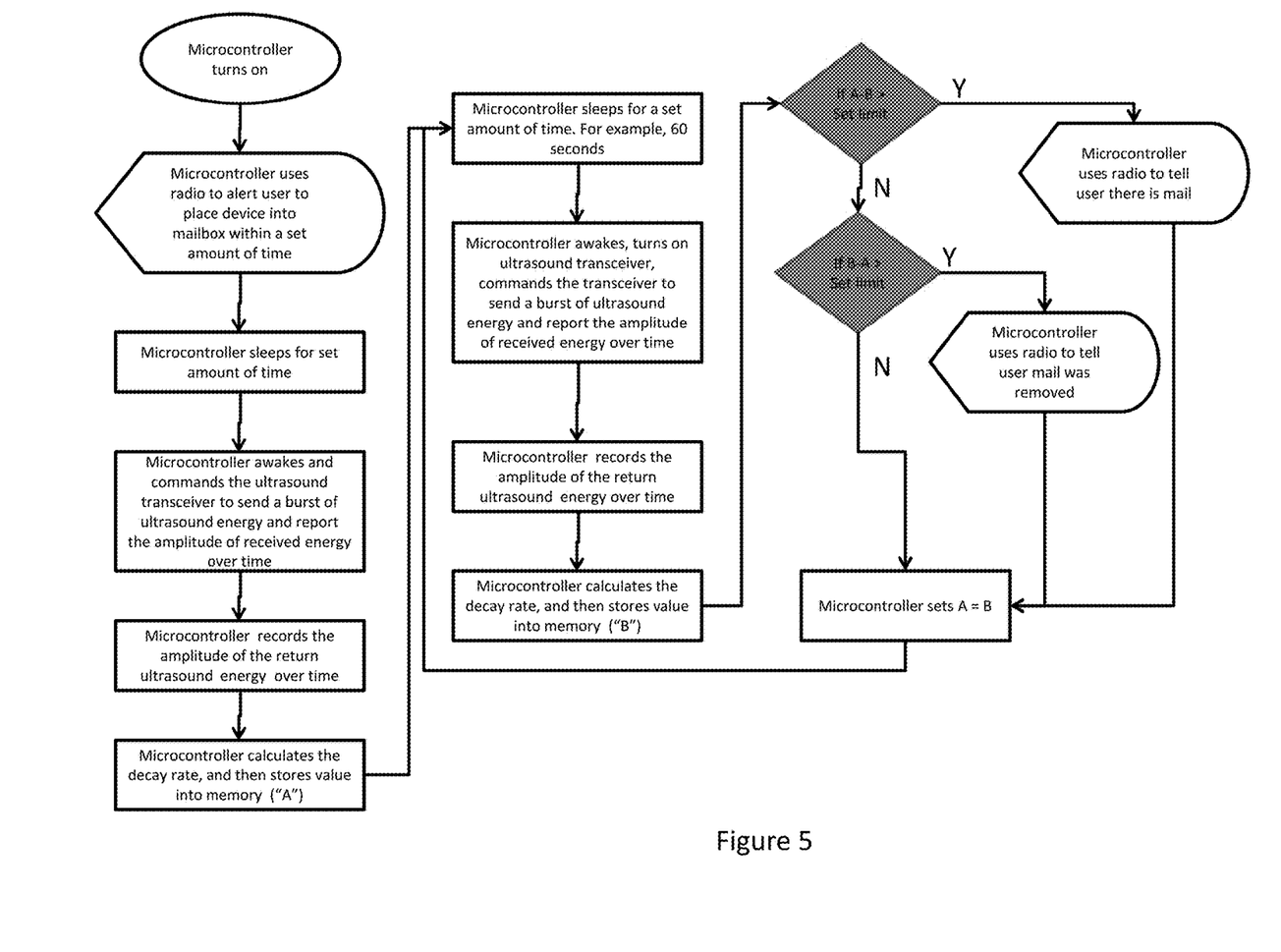
FIG. 5 is a flow diagram illustrating other exemplary logic for operating the system of FIG. 3.

FIG. 5 is a flow diagram illustrating other exemplary logic for operating the system of FIG. 3. In other exemplary embodiments, the determination that an object has been added to the receptacle 50 is made by subtracting the baseline decay rate from the test decay rate to arrive at a first value. If the first value is greater than a predetermined amount, then a determination that an object has been added is made. If no such determination is made, the test decay rate is subtracted from the baseline decay rate to arrive at a second value. If the second value is greater than the predetermined amount, then a determination is made that an object was removed from the receptacle. However, if the second value is less than the predetermined amount the test decay rate may be set as the new baseline rate.

The amount of change associated with the presence of an object, such as but not limited to, a postcard, may be dependent upon the ultrasound sensor's 11 frequency, gain, and beam pattern among others as determined by the microcontroller 12 or the second microcontroller 22. In exemplary embodiments, this value can easily be found by conducting a few readings of the decay rate with no object present and then with various types of objects being added to the receptacle 50.

Figure 6:
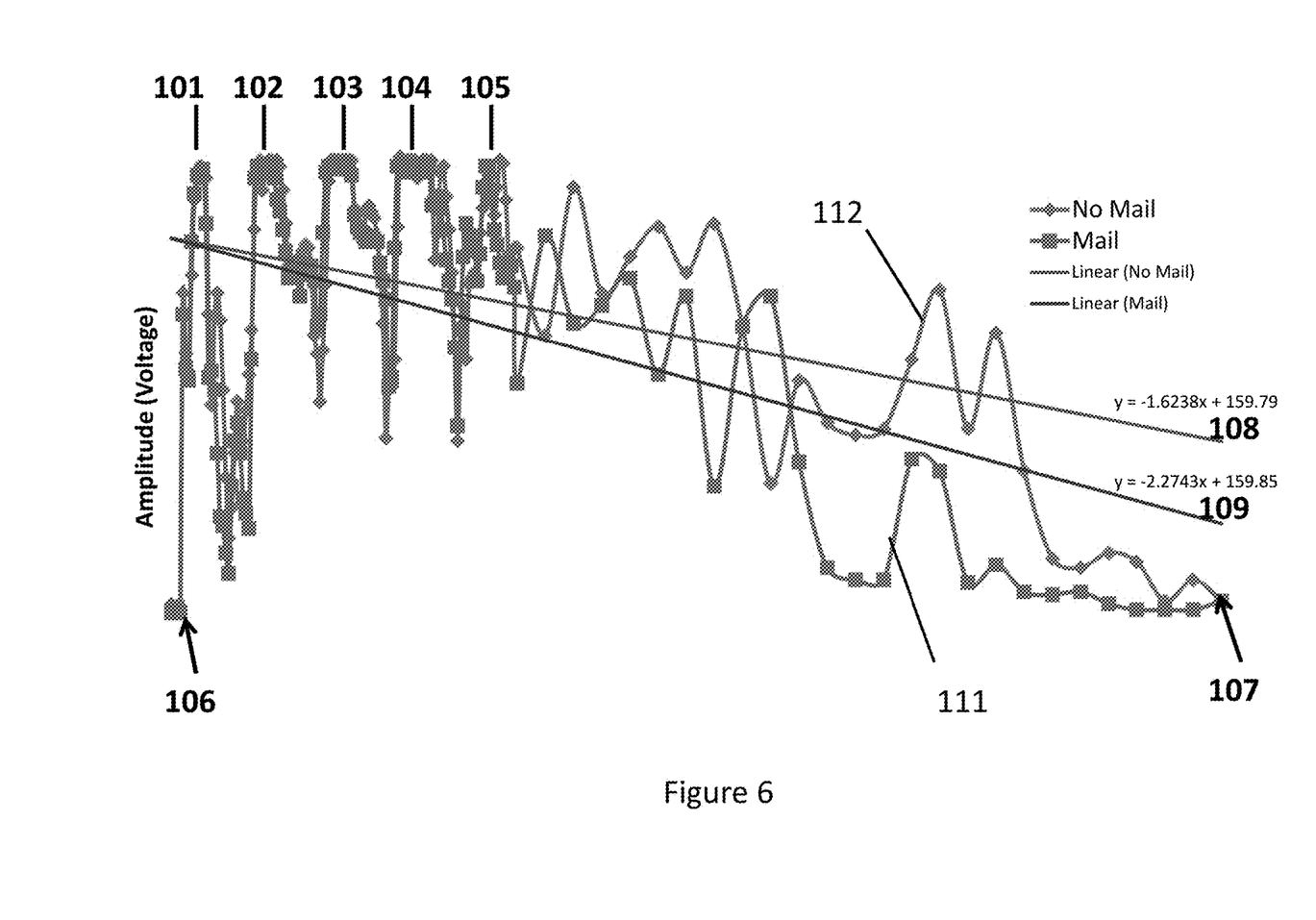
FIG. 6 is an exemplary data reading from system of FIG. 3 with and without a post card lying on the floor of the mailbox.

FIG. 6 provides an exemplary data reading from system of FIG. 3 with and without a post card lying on the floor of the mailbox. A first line 111 represents an exemplary data reading with a postcard lying on the floor of the mailbox. A second line 112 represents an exemplary data reading with no postcard lying on the floor of the mailbox. Item 106 represents the time tracking begins, here zero seconds. The burst from the ultrasound sensor 11 is at item 101. Item 102 represents the first echo of received at the ultrasound sensor 11. Item 103 represents the second echo received at the ultrasound sensor 11. Item 104 represents the third echo received at the ultrasound sensor 11. Item 105 represents the fourth echo received at the ultrasound sensor 11. Item 107 represents the time tracking ends, here 42 milliseconds. Item 108 is a linear average value of received data with no mail in the receptacle 50. Item 109 is a linear average of the received data provided with mail in the receptacle 50.

The approach described herein is advantageous for reliably detecting even the smallest pieces of mail, such as a single postcard, because multiple echoes allow the entire internal surface of the receptacle to influence the decay of the signal's amplitude by reflection, transmission, absorption, and diffusion of the ultrasound energy. As can be seen, the presence of mail (or another physical object) results in a greater decay rate. More specifically, similar decay rates indicate no change; faster indicates the addition of an object (e.g., mail) or even more objects being added to a receptacle (e.g., mailbox); and slower decay indicates the removal of an object (e.g., mail).

The microcontroller 12 may be programmed to wait a period of time before sending a notification to the remote unit 20 regarding the determination of the addition or removal of an object. This period of time may be few seconds or minutes, though any amount of time is contemplated. This wait may be used to ensure that the change detected is not simply the receptacle 50 being opened but rather an object being deposited. In another embodiment receptacle unit 10 may be used as a range finder to determine whether the mailbox is open or closed to ensure the change detected is not simply the receptacle 50 being opened. For example, without limitation, by a mailman who may only be servicing other mailboxes in a cluster mailbox. Once the receptacle unit 10 sends the data to the remote unit 20, the microcontroller 12 may be configured to wait for a reply from the remote unit 20. If no reply is given, the microcontroller 12 may be configured to periodically attempt to resend the data until an acknowledgement is received from the remote unit 20.

The remote unit 20 may be configured to continuously listen for a signal from the receptacle unit 10. Once a signal is received, the remote unit 20 may be configured to respond with an acknowledgement of receipt of the signal to the receptacle unit 10. The remote unit 20 may be configured to send a notification of either an objected being deposited or removed from the receptacle 50, by way of the network 30, to the remote user device 40 such that the user may be notified of the same. In effect, the remote unit 20 acts as an information bridge relaying the data gather by the receptacle unit 10 and sent to the remote unit 20 by way of the network 30. Because of low data requirements, long range radio links can be established using spread spectrum communication technologies, similar to the technology used by GPS. This is advantageous as the receptacle 50 being monitored is typically not within reach of the user's wireless networks. For example, without limitation, the user's mailbox is typically not within reach of their home wireless connection.

If one or more objects already present in the receptacle 50 are not removed when additional objects are added to the receptacle 50, the receptacle unit 10 may be configured to detect additional decay in the received signal and send the data to the remote unit 20, which may be configured to respectively notify the user by way of the remote user device 40 of the addition of one or more additional objects.

It is contemplated that notification may only be provided when the status of the receptacle 50 has changed. For example, if the last reading found that there were no objects in the receptacle 50, a second notification that there are still no objects in the receptacle 50 need not be provided. Only upon a change of status, for example the addition of a first or subsequent object to the receptacle 50, would a notification be send that that there is now a new object in the receptacle 50.

In exemplary embodiments, the remote unit 20 may be configured to interact with one or more additional smart home devices. For example, without limitation, the remote unit 20 may be configured to cause outdoor lighting to the mailbox to be turned on or off or autonomously catalog motion detected with security cameras as associated with the addition or removal of objects from the receptacle 50.

In a further embodiment where the receptacle 50 is a letter mailbox where mail is inserted vertically through the top, the receptacle unit 10 may be attached to the inside flap of the letter mailbox rather than facing towards the opening so that dust and dirt do not accumulate on the ultrasound sensor 11.

While several examples are given of the detection of mail or other objects in a mailbox, it is contemplated that the receptacle 50 may be any near fully closed compartment or area. For clarity, the receptacle 50 may comprise small gaps, such as without limitation, gaps configured to permit the deposit of letters, postcards, flyers, and other mail items. Likewise, the detected object may be any size or shape object. For example, without limitation, the receptacle 50 may be a room, lockbox, vault, drawer, and the like. Furthermore, while several examples are given of the use of ultrasonic energy and sensors 11, it is contemplated that other types of energy and related sensor which are capable of exciting molecules in an enclosure may be utilized. Such examples include, without limitation, lasers, x-rays, microwaves, and the like.

The connections described herein may be made by wireless and/or wired connection.

Any embodiment of the present invention may include any of the optional or preferred features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

What is claimed is:

1. A system for detecting addition or removal of an object from a receptacle comprising:
   an ultrasound sensor for placement within the receptacle and configured to:
   emit a first burst of ultrasonic waves;
   detect first burst data comprising an amplitude of the ultrasonic waves emitted by said first burst as they are echoed back to the ultrasound sensor over a first period of time;
   emit a second burst of ultrasonic waves; and
   detect second burst data comprising an amplitude of the ultrasonic waves emitted by said second burst as they are echoed back to the ultrasound sensor over a second period of time;
   a microcontroller electrically connected to the ultrasound sensor and configured to:
   receive the first burst data and the second burst data;
   determine a first decay rate of the first burst data; determine a second decay rate of the second burst data;
   subtract the first decay rate from the second decay rate to arrive at a first value;
   determine that the object has been deposited in the receptacle if the first value is greater than a predetermined amount;
   subtract the second decay rate from the first decay rate to arrive at a second value if the first value is not greater than a predetermined amount;
   determine that the object has been removed from the receptacle if the second value is greater than the predetermined amount; and
   set the second decay rate as the first decay rate if the second value is less than the predetermined amount.

2. The system of claim 1 wherein:
   the receptacle is a mailbox comprising an opening and defining an enclosure.

3. The system of claim 2 wherein:
   the ultrasound sensor is positioned within said enclosure and opposite said opening.

4. The system of claim 1 further comprising:
   an electronic storage device configured to receive and store data from the microcontroller;
   a power source in electrical connection with the ultrasound sensor, the microcontroller, and the electronic storage device; and
   a housing for said ultrasound sensor, microcontroller, electronic storage device, and power source.

5. The system of claim 4 further comprising:
   a radio in electronic communication with said microcontroller; a second radio in communication with said radio;
   a second microcontroller in electronic communication with said second radio; and
   a network connection device in communication with a remote user device by way of a network;
   wherein said radio is configured to transmit data from said microcontroller to said second microcontroller by way of said second radio;
   wherein said second microcontroller is configured to provide a notification to said remote user device if the microcontroller determines that the object has been deposited in the receptacle.

6. The system of claim 5 further comprising:
   a second electronic storage device configured to receive and store data from the second microcontroller;
   a second power source in electrical connection with the second radio, the second microcontroller, and the second electronic storage device; and
   a second housing for said second radio, second microcontroller, second electronic storage device, and second power source.

7. The system of claim 6 wherein:
   said power source comprises one or more batteries; and
   said second power source comprises a plug configured to be placed in electrical connection with a utility line.

8. The system of claim 6 further comprising:
   a speaker in electrical connection with said second microcontroller, wherein said second microcontroller is configured to cause said speaker to emit an audible sound if the microcontroller determines that the object has been deposited in the receptacle.

9. The system of claim 6 further comprising:
   an illumination device in electrical connection with said second microcontroller, wherein said second microcontroller is configured to cause said illumination device to illuminate if the microcontroller determines that the object has been deposited in the receptacle.

10. The system of claim 1 wherein:
    said first and second periods of time are equal.

11. The system of claim 1 wherein:
    the predetermined amount is zero.

12. The system of claim 1 wherein:
    the predetermined amount is a value greater than zero.

13. A method for detecting addition or removal of an object from a receptacle, said method comprising the steps of:
    providing an ultrasound sensor within a receptacle;
    placing a microcontroller in electrical communication with said ultrasound sensor;
    directing the ultrasound sensor to emit a first burst of ultrasound waves;
    detecting an amplitude of said ultrasound waves of said first burst over a first period of time;
    determining, at the microcontroller, a baseline decay rate for detected data from the first burst;
    waiting a period of time;
    directing the ultrasound sensor to emit a second burst of ultrasound waves;
    detecting an amplitude of said ultrasound waves of said second burst over a second period of time;
    determining, at the microcontroller, a test decay rate for detected data from the second burst;
    subtracting, at the microcontroller, the baseline decay from the test decay rate to arrive at a first value; and
    determining that the object has been deposited in the receptacle where the first value is greater than a predetermined amount;
    subtracting, at the microcontroller, the test decay rate from the baseline decay rate to arrive at a second value;
    determining that the object has been removed in the receptacle where the second value is a negative amount greater than the predetermined amount; and
    setting the test decay rate as the baseline decay rate where the second value is less than the predetermined amount.

14. The method of claim 13 wherein:
    the receptacle is a mailbox; and the receptacle is installed on a wall of the mailbox opposite an opening for depositing objects within said mailbox.

15. The method of claim 13 wherein:

the baseline decay rate is determined by taking a linear average of the amplitude of said ultrasound waves of said first burst over the first period of time; and the test decay rate is determined by taking a linear average of the amplitude of said ultrasound waves of said second burst over the second period of time.

16. The method of claim 13 wherein:

said first and second periods of time are equal.

17. The method of claim 13 wherein:

the predetermined amount is a non-zero number.

18. A system for detecting addition or removal of an object from a receptacle comprising:

a mailbox;

a receptacle unit placed within the mailbox and comprising:

an ultrasound sensor configured to emit at least a first and a second burst of ultrasound waves and detect an amplitude of echoes of each respective burst;

a microcontroller electrically connected to the ultrasound sensor, a radio; and a battery electrically connected to the ultrasound sensor, microcontroller, and radio; and a remote unit comprising:

a second radio in communication with the radio;

a second microcontroller electrically connected to the radio;

a network communication device in connection with a remote user device by way of a network; and a power source for providing power to the second radio, second microcontroller, and the network communication device;

wherein said microcontroller is configured to:

determine a first and second decay rate from the amplitudes of the echoes of the first and second burst of ultrasound waves, respectively;

compare the first and second decay rates;

determine that mail has been added to the mailbox if the second decay rate is larger than the first decay rate by a predetermined amount;

subtract the second decay rate from the first decay rate to arrive at a second value if the first value is not greater than a predetermined amount;

determine that the object has been removed from the receptacle if the second value is greater than the predetermined amount; and set the second decay rate as the first decay rate if the second value is less than the predetermined amount;

wherein said second microcontroller is configured to provide a notification to the remote user device if the microcontroller determines that mail has been added to the mailbox.

\* \* \* \* \*